(No Model.)

A. F. MACDONALD.
NUT LOCK.

No. 255,439.          Patented Mar. 28, 1882.

Witnesses:
John Grist
Wm. T. Magee

Inventor:
A. F. Macdonald
By Henry Grist
Att'y

N. PETERS. Photo-Lithographer, Washington, D. C.

UNITED STATES PATENT OFFICE.

ALEXANDER F. MacDONALD, OF WINNIPEG, MANITOBA, CANADA.

NUT-LOCK.

SPECIFICATION forming part of Letters Patent No. 255,439, dated March 28, 1882.

Application filed February 13, 1882. (No model.)

*To all whom it may concern:*

Be it known that I, ALEXANDER FRASER MACDONALD, of Winnipeg, in the county of Selkirk, in the Province of Manitoba, in the Dominion of Canada, have invented a certain new and useful Improvement in Nut-Locks; and I do hereby declare that the following is a full, clear, and exact description of the same.

This invention has reference to a plate for locking nuts collectively, and has for its object, besides locking the nuts, to overcome liability of breakage of the locking portion resisting the nut, and to allow said portion to be sprung up and depressed without injury or breakage, so that the plate can be reused after removal.

My invention consists of a locking-plate having a bolt-hole near each end, intermediate apertures to fit intervening nuts, and a longitudinal tongue formed by slitting the plate from both ends toward the center of the bolt-holes, thence outside the space occupied by the nuts of the bolts passing through said holes to a point on the opposite side of the space occupied by said nuts, and thence in a longitudinal direction toward the apertures, thus forming a rectangular recess, whereby a slitted portion of the plate will be covered by the nut of the bolt near the ends of the plate, and the other portion, forming the tongue, free to spring up near the sides of nut in the rectangular recess, the tongue offering an endwise resistance to a corner of the nut and thereby prevent it turning on its bolt, which also clamps the locking-plate to the fish-plate by passing through the holes near the ends to retain the plate, so as to lock the intermediate nuts, by not being able to turn in their respective apertures in the plate.

Figure 1:
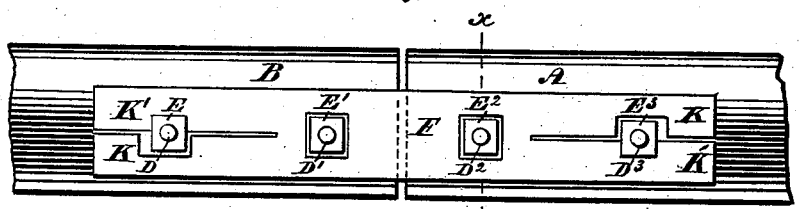
Figure 2:
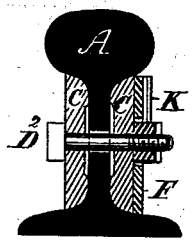
Figure 3:
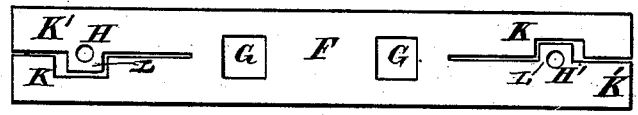

Figure 1 is a side elevation of my improved locking-plate applied to a rail-joint. Fig. 2 is a transverse section of the same on the line $xx$. Fig. 3 is a diagram of the plate detached.

A B are abutting-rails, C a fish-plate, D D' D² D³ bolts, and E E' E² E³ the nuts, as ordinarily used and placed in railway rail-joints, and to which my invention is to apply to lock the nuts collectively.

F is my improved locking-plate, provided with apertures G G to receive the nuts E' E² confinedly, in the ordinary manner, and holes H H', through which to pass bolts D D³, so that when nuts E E³ are applied plate F is thereby clamped against fish-plate C, thus securing the plate and locking the nuts E E³. The plate F is cut from both ends longitudinally toward the bolt-holes, and thence half-way around the seat L for the nuts, and thence longitudinally in a line along the middle of the plate to near the aperture G, where the cut terminates. The plate is thus subdivided from the ends into two sections, one section forming a tongue, K, which is free at the ends to spring up, whereby one corner of the nut will impinge the inner side of the rectangular recess, the tongue then offering an endwise resistance to prevent the nut turning on the bolt for locking the nut. The other section, K', or subdivision of the plate through which the bolt passes is retained against the fish-plate by the nut-seat L, (left around the bolt-hole formed by cutting out the rectangular recess in the tongue,) clamped by the nuts E E³, locked as before described, whereby the plate is held in position to lock the nuts E' E². By depressing the spring-tongues to allow the nuts E E³ to turn over them the plate can be removed and replaced without injury to it. The locking-plate is cut, whereby one of the tongues will be above and the other below the nuts E E³ when in position, thus allowing the plate to be used reversely.

I am aware that locking-plates have been constructed having apertures for some of the nuts and holes for some of the bolts to pass through, and short fingers to be turned abruptly against the nuts, and which fingers, when once used, are liable to be broken when removing the plate, whereby it is not capable of being again used; and in other cases, owing to the locking-finger having a side resistance to the nut and a sparseness of material resulting from the narrowness of the plate, the nut will force the finger laterally and break the lock. By my invention the tongue exerts an endwise resistance against the nut, and thereby avoids breakage, and being of sufficient length, the material will be elastic, to yield without being abruptly bent.

I claim as my invention—

1. The locking-plate F, having nut-apertures G G, bolt-holes H H', and tongues K K' cut longitudinally, commencing from the middle of the plate at the ends, thence half-way around the space to be occupied by the nuts of the bolts which pass through the holes H H′, and thence in a longitudinal direction toward apertures G G, whereby spring-tongues K K′ are formed, each tongue having a recess in which one corner of the nut impinges, said tongue offering an endwise resistance to the nut, and by depression permits the nut to be removed without injury to the plate, after the tongue has locked the nut, by being slightly sprung up, as set forth.

2. In combination with rails A B, fish-plate C, bolts D D′ D$^2$ D$^3$, and nuts E E′ E$^2$ E$^3$, the locking-plate F, having apertures G G, receiving the nuts E′ E$^2$, holes H H′, and longitudinally-cut tongues K K′, with a recess encompassing a portion of nuts E′ E$^2$, whereby the tongues offer an endwise resistance to said nuts when slightly sprung outward, and capable of depression for the removal of the nuts, as set forth and described.

A. F. MACDONALD.

Witnesses:
JOHN GRIST,
WM. L. MAGEE.